Patented Apr. 7, 1942

2,279,260

UNITED STATES PATENT OFFICE 2,279,260

REFRACTORY AND ABRASIVE MATERIAL AND PROCESS OF MAKING SAME

Raymond C. Benner, Henry N. Baumann, Jr., and George J. Easter, Niagara Falls, N. Y., assignors to The Carborundum Company, Niagara Falls, N. Y., a corporation of Delaware No Drawing. Application March 21, 1939, Serial No. 263,294

11 Claims. (Cl. 106—58)

The present invention is a continuation-in-part of copending application Serial No. 109,544 filed November 6, 1936, which in turn was a continuation-in-part of a previous application Serial No. 703,302 filed December 20, 1933. It relates to fused aluminous compositions modified by interfusion therewith of chromite ore whereby a solid solution of chromic oxide in alumina is produced in the form of trigonal crystals. A particular feature of the invention is the prevention of the formation of an objectionable amount of crystalline spinel in the final body as a result of the presence in the fusion of the magnesia and iron which are introduced in the chromite ore, since we have found that the presence of too much such spinel adversely affects the properties of the final body both as a refractory and as an abrasive.

It has been known for some years that pure alumina and pure chromic oxide form a continuous series of solid solutions together and while the admixture of chromic oxide with alumina was vaguely suggested many years ago as a likely refractory material, the cost of chromic oxide in even "commercially" pure form has been so high that no practical development has occurred in that line. It occurred to the present applicants that fusions of alumina with chromite warranted investigation however with a view to producing refractories of the trigonal crystalline solid solutions at a cost which would be comparable with that of other widely used special refractories, and the present invention has been the result of their research in that direction.

While it appears that some beneficiation of the alumina occurs from a refractory standpoint as a result of the addition thereto of even small amounts of chromite, we have found that a refractory of outstanding merit is produced if the total percentage of alumina plus chromic oxide is kept above 80% and the chromic oxide constitutes at least 8% of the total weight. The highest possible proportion of chromic oxide is desirable and it is in many cases possible to increase it to 15 or 20% or even 30% by judicious selection of the chromite ore and by furnacing in such a way as to reduce out part of the iron while still leaving the chromium in oxide form. In such cases the percentage of alumina decreases correspondingly from 70 or 80 to as low as 50%.

In order however that the desired trigonal crystal form may result it is necessary not only that the alumina and chromic oxide have the values stated but that the other ingredients have rather definite relations to one another. The percentage of magnesia is particularly critical, and while that of iron oxide is less so, iron oxide also acts in the same way as the magnesia. A reason for this will perhaps be apparent from a consideration of the molecular weights of the various oxides which are present and the fact that spinels have a strong tendency to crystallize from molten magmas containing these oxides.

The molecular weights are:

MgO ---- 40   $Al_2O_3$ ---- 102

FeO ---- 72   $Cr_2O_3$ ---- 152

On this basis it is apparent that in forming equimolal spinel compounds, magnesia takes up 2½ times its own weight of alumina or 3¾ times its own weight of chromic oxide, and ferrous oxide (which is the form of iron oxide present in the highly reducing conditions of an electric arc furnace) takes up materially more than its own weight of the trivalent oxides. Hence with, let us say, 5% MgO and 5% FeO there may be a direct spinel formation equal to 30 to 40% of the total weight. In this spinel additional alumina goes into solid solution as pointed out by Easter and McMullen in Patent No. 2,063,154 so that the aggregate of apparent spinel crystals readily grows to predominant proportions. While such spinel is for many purposes an excellent refractory, it is as previously noted not as good for some purposes (for example resistance to basic open hearth steel slag) as is the trigonal chromealumina refractory which is the subject of the present invention. Also when used for abrasive purposes the spinel is definitely softer than the corundum type crystal and hence is not desirable.

While it is not always necessary that the presence of spinel be completely prevented it is for many purposes advantageous that it be kept down to not over 20% or even less of the volume of the refractory and that the remainder of the refractory be composed of the trigonal crystals described above. Our problem thus became the discovery of means whereby the formation of spinel crystals could be materially if not completely inhibited or the determination of composition limits within which it did not occur. The composition of chromite varies between wide limits, the following being perhaps common ranges:

|   | Per cent |
|---|---|
| $Cr_2O_3$ | 40 to 58 |
| $Al_2O_3$ | 7 to 25 |
| FeO | 12 to 25 |
| $Fe_2O_3$ | 0 to 10 |
| MgO | 5 to 15 |

In introducing 8 to 30% $Cr_2O_3$ into a fusion, there is therefore an attendant introduction into the melt of 3 to 12% FeO and 1 to 7% MgO. Research showed that so long as the MgO and the FeO did not simultaneously exceed 2 and 5% respectively, there was no serious spinel formation. The FeO can be maintained at about this maximum in the final product by reduction of the iron oxide to metal in the furnace but the MgO is difficult to remove without disturbing the $Cr_2O_3$ content also, hence must be otherwise cared for if spinel formation is to be avoided in cases where ores high in magnesia are used.

We find that the introduction of small amounts of acid oxides such as $SiO_2$, $TiO_2$, $ZrO_2$ or $B_2O_3$ into the melt materially reduces the tendency of the additional MgO to cause spinel formation. Foremost in showing this ability to offset the effect of the MgO is silica, followed fairly closely by titania. The amount of acid oxide which is required increases with increasing magnesia somewhat as indicated in the following table:

| Minimum $SiO_2$ | Minimum $TiO_2$ | Maximum MgO |
|---|---|---|
| 0 | 0 | 2 |
| 1 | 0 | 3 |
| 0 | 1 | 3 |
| 0 | 3 | 5 |
| 2 | 0 | 5 |

This requirement may be met by silica and titania introduced with the alumina or silica may be added to the melt directly. A small excess of the acid oxide does no harm so that in general we have 2 to 7% of acid oxides in our final product. If however the magnesia runs high care must be taken that the acid is also proportionately high if the proportion of spinel is to be kept below 20%. Chromites which are inherently low in magnesia are occasionally found. When it is possible to select such ores we prefer to do so, and to so proportion the ingredients of our fusion as to yield not over 2% MgO in the final product. In such cases as in others it is desirable to reduce the FeO to around 5 or 6%. While the effect of impurities is somewhat complicated, the basic principle is that the magnesia should be counteracted by other oxides which have a strong tendency to combine with it and hence to tie it up in such a manner as to decrease the tendency to form spinels with chromic oxide and alumina.

In the fusions resulting in a trigonal crystal product, it appears probable that the iron oxide goes into solid solution to some extent in the crystalline phase and that the remainder combines with the impurities in the interstitial areas. Titania is also known to form solid solutions in alumina crystals and it is possible that some of the titania in these fusions is thus taken up, hence accounting for the fact that titania is slightly less effective than silica per unit of weight in counteracting the effects of magnesia, although the higher molecular weight of the titania would also tend in this same direction. The magnesia together with silica, etc., seems to in general form an amorphous intercrystalline matrix between the trigonal crystals rather than to form crystalline magnesium silicates, although in bodies very high in magnesia and silica a very few such crystals are sometimes discernible.

In carrying out this invention in accordance with one of our preferred methods, we use a good grade of aluminous material containing at least 95% $Al_2O_3$, the impurities being chiefly silica and oxides of iron and titanium. We have also used alumina as high as 99% in $Al_2O_3$. The $Cr_2O_3$ content is obtained by adding selected commercial chromite ores high in $Cr_2O_3$ content. A little chromic oxide may also be added.

As an example of the use of a commercially available ore, and the result of its treatment by our process we may take the following tabulations showing the composition of the original chromite ore and of the material resulting from the fusion of this ore with three times its own weight of fused alumina scrap grain.

|  | Composition of ore | Composition of product |
|---|---|---|
|  | Per cent | Per cent |
| $Cr_2O_3$ | 56.8 | 14.8 |
| FeO | 13.2 | 5.0 |
| $Al_2O_3$ | 7.6 | 69.9 |
| MgO | 15.3 | 4.4 |
| $SiO_2$ | 3.1 | 4.4 |
| $TiO_2$ |  | 2.7 |

The increase of silica and titania is accounted for by their presence in the impure alumina scrap used. The product consisted of over 80 per cent of well intergrown chrome-corundum crystals with the residual oxides entirely inclosed as isotropic interstitial material. If pure alumina had been used the amount of chrome-corundum would have been smaller and instead of the typical trigonal form of crystallization, a considerable proportion of chromite-spinel with alumina in solid solution would have been obtained.

In carrying out our invention we have found it satisfactory to use an electric furnace similar to that commonly used for the production of fused alumina for abrasive purposes, generally consisting of a water-cooled iron shell without any lining other than that built up by the material being fused as it is fed into the furnace. Fusion is effected initially by the heat from an electric arc between 2 or more electrodes inserted in the iron shell; but after a bath of molten material is formed, the resistance of this material to the passage of electric current through it is used to supply heat. The material is gradually fed in and the electrodes raised as the fused mass is built up. Apparatus of this type is shown and described in the patent to F. J. Tone, No. 929,517, granted July 27, 1909.

Economies may, under some circumstances, be effected by fusing an ore which is a source of one of the oxides in the electric furnace, and then adding the source of the other oxide to the molten contents of the furnace. For instance, we may fuse bauxite, following the procedure best suited to eliminate impurities as is well known in the manufacture of fused alumina abrasives, and then add the chromite ore to the molten mass. An alternative procedure is to first fuse the chromite ore in the electric furnace and then add the source of alumina, such as previously fused alumina of bauxite ore. The latter sequence of steps is sometimes used to purify low grade chrome ore by reducing the iron out preferentially, leaving behind the chromium oxide, which reduces less readily.

For producing refractory blocks and other pieces we, in general, cast the molten material into suitable molds by tapping or tilting the furnace so that the molten mass flows into the mold. It is always desirable but particularly so in the latter case, that provision be made to prevent molten material spilling into the water cooling system. This may be accomplished by the use of an iron apron properly positioned.

The molten material is heated to a temperature considerably above its melting point, and is then poured into molds which may be of granular refractory material bonded with a core binder such as is commonly used in foundry practice, or may be made of slabs of preburned refractory, of carbon, or of a suitable metal. These molds may be preheated if desired, and may be insulated to prevent too rapid loss of heat, by embedding them in a molding flask in which they are surrounded by sand or heat insulating material.

The molds should be provided with risers of ample size to permit complete filling of the mold without interference by material freezing in the headers. If the riser is made wedge shaped with its minimum section immediately adjoining the mold, removal of the excess material constituting a header is facilitated. After a mold is filled it is moved away and additional molds also filled successively.

The molded pieces are left in the mold for heat treatment, or, in the case of iron molds particularly, the pieces are taken from the molds shortly after the outer walls of the casting have solidified and then annealed without other than their own support. The headers should be removed from the castings at this point by sledging, as the castings are tougher at this stage than when cold and there is less danger of their being cracked by the hammering. With a header tapering to a smaller sectional area next to the casting, removal in this manner is usually simple and fairly clean.

For annealing we may utilize any of the customary annealing practices such as placing the molded pieces in a furnace and gradually reducing their temperature, covering the pieces with hot sand or other insulating material, or heavily insulating the pieces and allowing them to anneal by virtue of their own heat or by that of other blocks packed closely together with them.

The time-temperature curve required to secure given results naturally varies with the shape and size of the pieces and also with the exact composition of the material being cast. In general, it may be said that if a given rate produces cracking it is obviously desirable to further retard the rate of cooling over some or all of the cooling range. After the pieces are cold any objectionable remainder of the header or other minor protuberances may be removed by chipping, or in minor cases by grinding.

After the chromium-oxide-alumina mixture is melted, it may be allowed to cool in the furnace instead of pouring the molten refractory material into molds. In thus using the furnace itself as a mold, it is desirable to line it with a very light coating of refractory material so that the molten material may extend out to the edges to form a smooth block. Charging is carried on just as before, the electrodes being gradually withdrawn and a block built up to the desired thickness. This method of molding has the disadvantage that only one mold can be filled at a time, but this is compensated for by the fact that practically no material is lost in headers, etc., as in the other type of mold. It is sometimes desirable to provide furnace molds of this type with a small dimensional draft to facilitate removal of the piece from the mold although due to the considerable shrinkage after solidification this is in general unnecessary.

When the fusion is cold, it is taken out as a pig and broken up or crushed to fragments or particles of the desired size. The fragments or particles of this material when reduced to the proper size are admirably suited for use in making bonded refractory articles. Fragments of proper size are also suitable for use as abrasive grain. Bonded refractories may be made in the usual way by choosing proper grit mixes, adding suitable bonding materials, forming by molding or other methods and then firing in a ceramic kiln to high temperatures. Preferably the bond used should, as a raw material, be similar in composition to the grain itself.

Refractory shapes made in accordance with our invention are of particular value in various metallurgical applications, both in ferrous and non-ferrous furnaces, electric furnaces, chemical processes, etc. Their slag resistance makes them useful in general refractory service.

Fusions of chromium oxides and aluminum oxide made in accordance with our invention offer several advantages favoring their use as abrasives. Their crystals fracture in such a way as to make them effective as abradants. The fracture tends to be hackly instead of conchoidal as in ordinary fused alumina. The material is tough, and is harder than pure fused alumina.

While we have briefly referred to certain representative uses to which these fusions containing $Cr_2O_3$ and $Al_2O_3$ may be put, others will readily occur to persons skilled in the art to which they pertain. We have described certain details as to the elimination of at least a part of the impurities which are associated wtih $Cr_2O_3$ in the sources of supply of such oxides and preferred methods of balancing the amounts of such impurities with respect to one another whereby the effect of one is nullified by the presence of the other so as to obtain a definite trigonal form of crystallization. It is to be understood that our invention is not limited to details such as these, but may be otherwise embodied and practiced within the scope of the following claims.

We claim:

1. A cast refractory article consisting principally of trigonal crystals of a solid solution of alumina and chromic oxide, the chromic oxide being at least 8% and the alumina and chromic oxide together being at least 80% of the weight of the article, said article also comprising 2 to 6% FeO, 1 to 6% MgO and 2 to 7% of acid oxides, the acid oxides being present in amount sufficient to materially inhibit the formation of spinel crystals within the article.

2. In the process of making a refractory article from a fushion of chromite and a source of alumina whereby a solidified mass of trigonal crystals of a solid solution of chromic acid and alumina results, said article comprising magnesia in excess of 2% and ferrous oxide, the step which comprises incorporating silica in the fusion in such proportion as to substantially decrease the formation of spinel crystals in the said article.

3. A solidified fused mass formed from a fusion of chromite and a source of alumina, said mass consisting principally of trigonal crystals of a solid solution of chromic oxide and alumina, said two oxides constituting over 80% by weight of the mass and the chromic oxide constituting at least 8%, said mass comprising also 1 to 7% magnesia, 3 to 5% ferrous oxide and sufficient acid oxides to prevent the presence of more than 20% spinel crystals by volume in the mass.

4. The method of making a composition of matter comprising in major proportion a solid solution of aluminum oxide and chromium oxide, which comprises forming a fusion of materials comprising magnesia-containing chromite and a source of alumina whereby the said fusion contions not more than 2.0% by weight of MgO and not more than 5% by weight of iron oxide and solidifying the fushion.

5. The method of making a composition of matter comprising in major proportion a solid solution of aluminum oxide and chromium oxide, which comprises forming a fushion of magnesia-containing chromite under reducing conditions to eliminate at least a portion of the oxides of iron and silicon, diluting the said fushion with alumina whereby the said fusion contains not more than 20% by weight of MgO and not more that 5% by weight of iron oxide, and solidifying the fushion.

6. The method of making a composition of matter comprising in major proportion a solid solution of aluminum oxide and chromium oxide, which comprises forming a fushion of materials comprising magnesia-containing chromite, chromic oxide, and a source of alumina whereby the said fushion contains not more than 2.0% by weight of MgO and not more than 5% by weight of iron oxide, and solidifying the fushion.

7. A cast refractory article solidified from a fushion consisting of magnesia-containing chromite and aluminum oxide, in which article the magnesia is maintained below 2.0% and the iron oxide below 5%.

8. A cast refractory article composed principally of trigonal crystals of a solid solution of 8 to 30 parts chromic oxide and 50 to 85 parts alumina, said oxides constituting at least 80% of the article, said article comprising also 3 to 6% FeO, 1 to 5% magnesia and sufficient acid oxides to substantially inihibit the presence of spinel crystals in the article.

9. A solidified fused mass consisting of alumina and chromic oxide, and up to 20% of other oxides including magnesia and acid oxides, said mass being composed principally of trigonal crystals of a solid solution of alumina and chromic oxide and being substantially free from spinel crystals.

10. The method of making a composition of matter comprising in major proportion a solid solution of alumina and chromic oxide in the form of trigonal crystals, which comprises fusing together and thereafter cooling chromite and a source of alumina under such conditions that the composition shall contain not over 6% FeO, and so proportioning the ingredients that the $Cr_2O_3$ shall constitute at least 8%, alumina plus $Cr_2O_3$ at least 80%, magnesia from 1 to 6% and acid oxides a sufficient percentage to prevent the presence of more than 20% of spinel crystals in the finished product.

11. In the production of a product consisting predominantly of a trigonal crystalline mass of a solid solution of chromium oxide in aluminum oxide from a fusion of raw materials comprising enough magnesia to normally produce a substantial proportion of spinel crystals, the step which comprises adding acidic oxides to the fusion in sufficient proportion to substantially inhibit the tendency of the magnesia to crystallize in spinel form.

RAYMOND C. BENNER.
HENRY N. BAUMANN, Jr.
GEORGE J. EASTER.